United States Patent

Searles et al.

[11] Patent Number: 5,991,707
[45] Date of Patent: Nov. 23, 1999

[54] METHOD AND SYSTEM FOR PREDICTIVE DIAGNOSING OF SYSTEM RELIABILITY PROBLEMS AND/OR SYSTEM FAILURE IN A PHYSICAL SYSTEM

[75] Inventors: Warren W. Searles, Rockton; Brett W. Searles, Riverside, both of Ill.

[73] Assignee: Hydrotec Systems Company, Inc., Rockton, Ill.

[21] Appl. No.: 09/036,711

[22] Filed: Mar. 9, 1998

[51] Int. Cl.$^6$ ................................................... G06F 15/18
[52] U.S. Cl. ........................... 702/185; 702/183; 706/45; 324/770; 324/71.3
[58] Field of Search .................................... 702/179, 181, 702/182, 183, 185; 324/772, 770, 71.3; 395/183.02; 706/45

[56] References Cited

U.S. PATENT DOCUMENTS

| | | | |
|---|---|---|---|
| 5,014,220 | 5/1991 | McMann et al. | 364/513 |
| 5,377,112 | 12/1994 | Brown, Jr. et al. | 364/431.12 |
| 5,399,961 | 3/1995 | Wild et al. | 324/71.1 |
| 5,523,701 | 6/1996 | Smith et al. | 324/772 |
| 5,561,610 | 10/1996 | Schricker et al. | 364/551.01 |
| 5,566,091 | 10/1996 | Schricker et al. | 364/551.01 |
| 5,581,694 | 12/1996 | Iverson et al. | 395/183.02 |
| 5,608,338 | 3/1997 | Maeda | 324/770 |

OTHER PUBLICATIONS

Abstract of U.S. Patent No. 4,213,175, issued Jul. 5, 1980, Kurihara, discloses a fault–detecting apparatus.
Abstract of U.S. Patent No. 4,736,429, issued Apr. 5, 1988, Niydada, et al., discloses an apparatus for speech recognition which includes the storage of phoneme standard patterns.
Abstract of U.S. Patent No. 4,755,925, issued Jul. 5, 1988, Tsuchiya et al., discloses a plant diagnostic system.
Abstract of U.S. Patent No. 4,984,275, issued Jan. 8, 1991, Watanabe et al.
Abstract of U.S. Patent No., 5,062,137, issued Oct. 29, 1991, Watanabe et al.
Abstract of U.S. Patent No. 5,101,337, issued Mar. 31, 1992, Ebizuka.
Abstract of U.S. Patent No. 5,199,439, issued Apr. 6, 1993, Zimmerman et al.
Abstract of U.S. Patent No. 5,241,649, issued Aug. 31, 1993, Niyada.
Abstract of U.S. Patent No. 5,345,536, issued Sep. 6, 1994, Hoshimi, et al.
Abstarct of U.S. Patent No. 5,347,635, issued Sep. 13, 1994, Voeten, et al.
Abstract of U.S. Patent No. 5,355,311, issued Oct. 11, 1994 Horioka.

(List continued on next page.)

*Primary Examiner*—John Barlow
*Assistant Examiner*—Hien Vo
*Attorney, Agent, or Firm*—The Law Office Of Joan I. Norek; Joan I. Norek

[57] ABSTRACT

A method and system diagnoses system reliability problems and/or system failure in a physical system through the predictive identification of errant fluctuations in one or more operating parameters of said physical system. The values of at least one kind of operating parameter of physical system are determined. A data stream of the parameter values are divided into one or more sets, and the sets are associated into one or more series. Through a series of mathematical calculations, it is determined whether an N0, Nx or N1 condition exists. An N0 condition indicates that the values are probably within a good operating range. An Nx condition indicates the probability of approaching a point outside of a good operating range condition. An N1 condition indicates the entering of the range of possible system failure.

22 Claims, 2 Drawing Sheets

OTHER PUBLICATIONS

Abstract of U.S. Patent No. 5,406,502, issued Apr. 11, 1995, Haramaty et al.

Abstract of U.S. Patent No. 5,410,254, issued Apr. 25, 1995, Consiglio.

Abstract of U.S. Patent No. 5,465,321, issued Nov. 7, 1995, Smyth.

Abstract of U.S. Patent No. 5,479,576, issued Dec. 26, 1995, Watanabe et al.

Abstract of U.S. Patent No. 5,533,410, issued Jul. 9, 1996, Smith.

Abstract of U.S. Patent No. 5,545,961, issued Aug. 13, 1996, Peter et al.

Abstract of U.S. Patent No. 5,616,996, issued Apr. 1, 1997, Tang et al.

Abstract of U.S. Patent No. 5,631,569, issued May 20, 1997, Moore, et al.

Internet page excerpt, "Distance to Fault", Leading Edge Research.

Internet page excerpt, "Characteristic Impedance", T. Healy, Santa Clara University.

Internet page excerpt, excerpt from book "Interfacing", T. Gal, Technical University of Budapest.

"Practical Statistics Simply Explained", R. Langley, 1971, Dover Publications, Inc., New York, N.Y., pp. 32–36 and 152–165.

"Introduction to the Practice of Statistics", D. S. Moore and G. P. McCabe, 1989, W. H. Freeman and Company, pp. 50–69, 444–456 and 510–513.

"Gas Detection in Theory and in Practice", E. M. Zdankiewicz, Keithley Instruments, Inc., "Sensors", Oct. 1997.

"Quality Control and Industrial Statistics", pp. 549–561 and 766–769.

METHOD AND SYSTEM FOR PREDICTIVE DIAGNOSING OF SYSTEM RELIABILITY PROBLEMS AND/OR SYSTEM FAILURE IN A PHYSICAL SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention is in the technical field of system-reliability monitoring and predictive evaluation. In other words, the present invention is in the technical field of predictive identification of system reliability problems and/or system failure.

U.S. Pat. No. 5,014,220, issued May 7, 1991, McMann et al., (the '220 patent") is directed to a method for generating reliability models for fault-tolerant systems in which the interrelationships between components are too complex to model. The '220 patent defines reliability analysis as the analysis of events that contribute to the occurrence of undesirable conditions, and the application of probability theory to determine that the likelihood of these conditions falls within acceptable limits. The invention of the '220 patent is a reliability-model generator which automatically generates a composite reliability model for a complex system. The reliability model generated then can be analyzed by existing reliability analysis tools. Described therein is a prior art evaluation tool entitled SURE that computes the upper and lower bounds on system reliability given the initial state and those states that represent an unreliable system. According to the '220 patent, the use of SURE will require excessive computing resources to solve and validate a model for a complex system if the model encompasses excessive state/space relationships. The invention of the '220 patent is a system for aggregating a plurality of low-level reliability models into a single reliability model based upon definitions of interrelationships of the low level models.

U.S. Pat. No. 5,377,112, issued Dec. 27, 1994, Brown, Jr. et al., is directed to an engine diagnostic method in which the differences between actual and model conditions of a plurality of operating parameters are used for diagnosis. The data falls into one of the fault regions if there are significant discrepancies between the modeled and actual values.

U.S. Pat. No. 5,399,961, issued Mar. 21, 1995, Wild et al., is directed to a system for monitoring the performance of an oxygen probe of a catalytic converter, in which the performance loss is deemed impermissible when a certain mean value drops below a threshold value. The mean value is a time-dependent mean value. The measure of the sought-after mean value is the ratio of (1) the number of scanning values within a pre-given range, to (2) the total number of scannings.

U.S. Pat. No. 5,523,701, issued Jun. 4, 1996, Smith et al., is directed to diagnostic and monitoring systems which use the frequency of a motor's current to judge machine operation based on the background noise of the current spectrum.

U.S. Pat. No. 5,561,610, issued Oct. 1, 1996, Schricker et al., is directed to a system in which the slope (of a graph of values) and duration of a parameter having a value that is dependent upon machine performance is determined, and a warning is given when the level is greater than a threshold. The purpose of the system is to predict failures using a warning threshold that is a function of duration and slope of the condition. The fault would be signaled when either the slope value or duration value is too high.

U.S. Pat. No. 5,566,091, issued Oct. 15, 1996, Schricker et al., is directed to a method for diagnosing and predicting component failure by monitoring similar machine components in parallel to produce trend information. The trend in the differences between a plurality of parallel components is determined and recorded and this historical information is employed to track future component performance.

U.S. Pat. No. 5,581,694, issued Dec. 3, 1996, Iverson et al., is directed to a method for predicting failures in electronic and mechanical systems that have a plurality of interconnected units. The method integrates the operating data of the separate units.

U.S. Pat. No. 5,608,338, issued Mar. 4, 1997, Maeda, is directed to a method for determining the life or reliability of a "thin film transistor" ("TFT") that factors in variations when a plurality of TFT's are manufactured under the same conditions.

BRIEF SUMMARY OF THE INVENTION

The present invention is a method and a system for the predictive identification of errant fluctuations in system operating parameters, and the predictive diagnosing of system reliability problems and/or system failure. The method and system of the present invention are substantially independent of, and not dictated by externally prescribed boundaries, thresholds, operating models or manufacturer's specifications.

The present invention is a method and system of evaluating the present-time operating reliability of a physical system, preferably a computer-implemented method and system, in which the occurrence of operating parameters that reflect an operating problem and/or the possible approach of a system failure, deficiency or decline are identified. The present invention goes beyond the mere detection of operating parameter values outside of operating specifications. The method and system in an embodiment include taking a series of measurement sets of at least one system operating parameter, and determining statistically therefrom the probability that the mean value of any of the sets reflects an errant fluctuation of significance, without reference to standards, criteria or patterns external to the series other than at times a parent-group mean and/or parent-group standard deviation. The method and system in an embodiment include identifying or defining significantly errant operating-parameter values statistically from a series of measurement sets.

One or more kinds of operating parameters may be measured and evaluated sequentially or simultaneously. The operating parameter(s) monitored and/or evaluated may be a performance, a condition (state) or environmental parameter or combinations thereof.

The identification of a significantly errant or deviant parameter in preferred embodiment activates a signal or notification sign indicating the need for system maintenance and/or system shutdown or shut-off. System maintenance can include protective system adjustment(s), component replacement(s) or system replacement.

It is envisioned that the present method and system will possibly provide the highest level of predictive-monitoring value when employed in monitoring a system that is operating wholly within specifications or within bounds that are otherwise deemed normal or acceptable. The method and system's identification of a significantly errant or deviant set of parameter values in such an "in-specifications" system can provide a maintenance warning ahead of any off-specifications operation and thus well ahead of actual system failure or significant system decline.

DETAILED DESCRIPTION OF THE INVENTION

Figure 1:
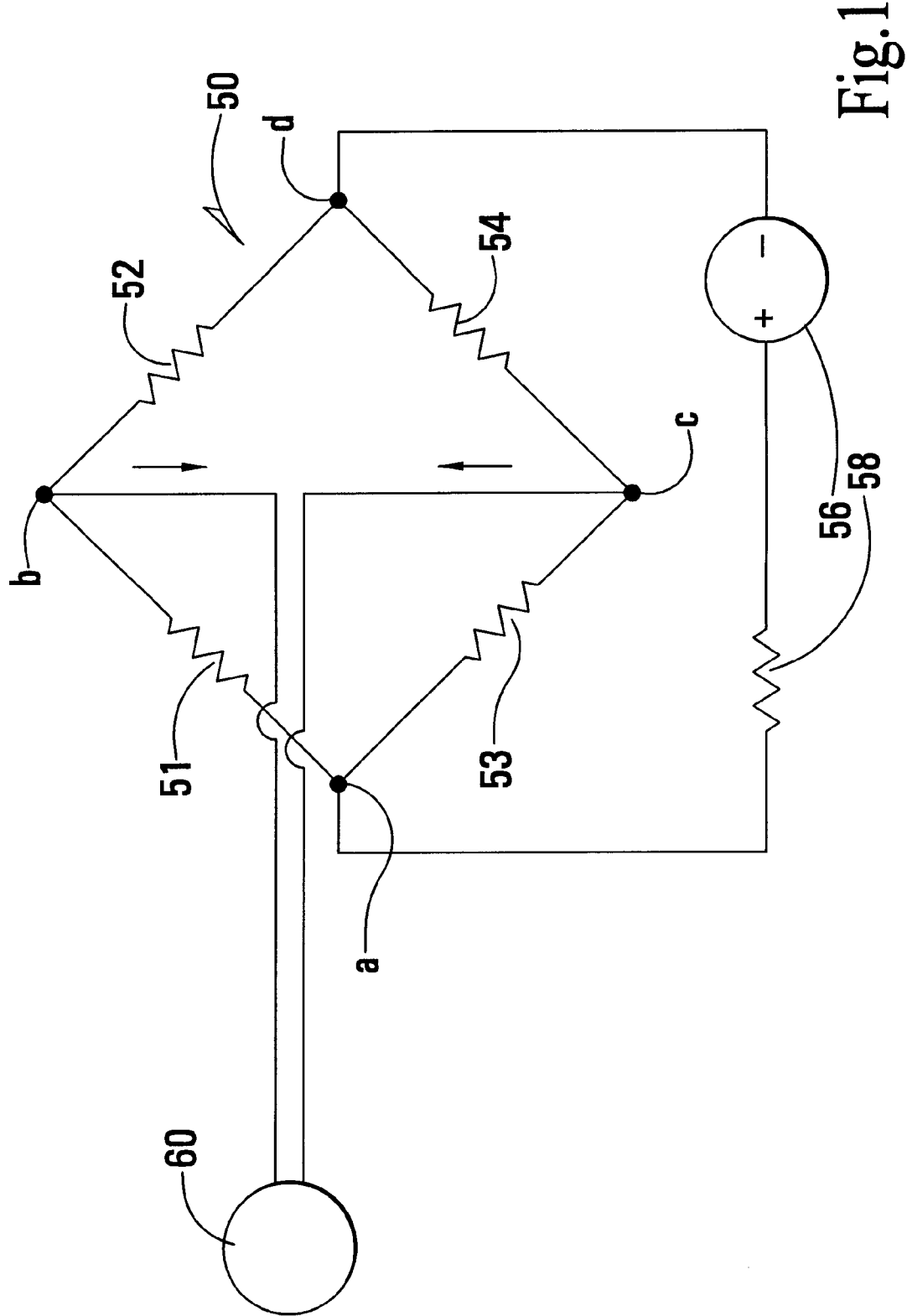
FIG. 1 is a flow diagram particularizing a system within the invention.

The physical system may be a substantially electrical system wherein the operating parameter being measured is a performance or condition parameter such as voltage, resistance, impedance, amperage, or the like, or an environmental parameter such as temperature, humidity or the like within the system or in the vicinity of the system, or a plurality of such parameters. The physical system may be a substantially electromechanical system such as a motor, pump, meter or the like. The physical system may be substantially an electro/chemical system such as running batteries, other electrolysis operations, nerve and muscle contractions and the like. The physical system may be a substantially mechanical system or a substantially chemical system. The system may be a substantially chemical or mechanical or bio-mechanical system in which an operating parameter such as a performance or environmental condition is monitored by measuring an electrical output signal. The system may be for instance a substantially electrical system in which a condition such as a performance or environmental condition is monitored by measuring a chemical or mechanical output signal. The present invention is not limited to any particular type of physical system nor is it limited to directly monitoring an operating parameter. Again a performance, condition and/or environmental parameter can be monitored "indirectly" through dependent and/or related output signals.

The present invention is illustrated below in a group of examples wherein the output signal being tracked is electrical for a number of reasons. An electrical signal is readily tracked. The application of the method and system of the present invention is more readily illustrated using simple electrical systems. Electrical output signals are often the signals of choice for monitoring a wide variety of physical systems of diverse types. Tracking an electrical parameter easily lends itself to a computer-implemented monitoring wherein fluctuating values can be rapidly measured and evaluated. In general, the method and the system of the present invention are outstandingly applicable to systems in which the output signal tracked is electrical, regardless of whether or not the operating parameter being monitored is itself electrical.

The method and system of the present invention to a significant extent adopt the "Student's t test" in the method's or system's determination of the probability that the departure of one or more operating parameters from a parent mean or normalized mean value is due to chance, or whether instead it indicates the approach of a system decline and/or failure. The Student's t test is a statistical significance test.

The Student's t test can be used to compare measurements with a large parent group when the mean but not the standard deviation of the parent group is known. The Student's t test is a modification of the zM test, and differs therefrom in that the standard deviation of the sample measurements is used instead of the large parent group standard deviation. The Student's t table, or a mathematically-computed determination of probability, takes into account the number of sample measurements because the smaller the size of the group of sample measurements, the larger the likely deviation from an established pattern. A tentative negative assumption is made that there is no significant difference between the mean of a sample group measurements and the mean of the parent group. The probability of this tentative negative assumption being the case is determined by first calculating the value of "t". With the "t" value and number of sample measurements, the Student's t table or computational equivalent provides the probability that the deviation is not significant. "t" is determined from Formula 1:

$$t = (\text{square root of } n)(M-m)/s \qquad \text{Formula 1}$$

wherein n=number of measurements in the sample group.

m=mean of the sample measurements.

s=standard deviation of the sample measurements, calculated at the same time as the mean.

$M_p$=mean of the large parent group.

The conversion from "t" values to probabilities dependent upon the number of measurements in a sample group ("n") is taken from the Student's t table. Shown below is Table 1 (the "w Table") used in the present invention for the conversion of "w" values to probabilities. Other than the use of the symbol w instead of t, the use of $n_g$ rather than n, the use of $m_s$ rather than m, and the use of M rather than $M_p$, the w Table and its computational equivalent are identical to the Student's t table and its computational equivalent. The present invention is not limited to conventional or traditional uses of the Student t test or theory. As seen in the w Table, the lowest number of "samples" for which a w value is available is three.

TABLE 1

"w Table"

| No. in sample $n_g$ | Probability (P) of no significant difference between M and $m_s$ | | | |
|---|---|---|---|---|
| | P = 10% | P = 5% | P = 1% | P = 0.2% |
| 3 | w = 2.92 | w = 4.30 | w = 9.92 | w = 22.33 |
| 4 | 2.35 | 3.18 | 5.84 | 10.21 |
| 5 | 2.13 | 2.78 | 4.60 | 7.17 |
| 6 | 2.02 | 2.57 | 4.03 | 5.89 |
| 7 | 1.94 | 2.45 | 3.71 | 5.21 |
| 8 | 1.89 | 2.36 | 3.50 | 4.79 |
| 9 | 1.86 | 2.31 | 3.36 | 4.50 |
| 10 | 1.83 | 2.26 | 3.25 | 5.30 |
| 11 | 1.81 | 2.23 | 3.17 | 4.14 |
| 12 | 1.80 | 2.20 | 3.11 | 4.02 |
| 13 | 1.78 | 2.18 | 3.05 | 3.93 |
| 14 | 1.77 | 2.16 | 3.01 | 3.85 |
| 15 | 1.76 | 2.14 | 2.98 | 3.79 |
| 16 | 1.75 | 2.13 | 2.95 | 3.73 |
| 17 | 1.75 | 2.12 | 2.92 | 3.69 |
| 18 | 1.74 | 2.11 | 2.90 | 3.65 |
| 19 | 1.73 | 2.10 | 2.88 | 3.61 |
| 20 | 1.73 | 2.09 | 2.86 | 3.58 |
| 21 | 1.72 | 2.09 | 2.85 | 3.55 |
| 22 | 1.72 | 2.08 | 2.83 | 3.53 |
| 23 | 1.72 | 2.07 | 2.82 | 3.50 |

TABLE 1-continued

"w Table"

| No. in sample $n_g$ | Probability (P) of no significant difference between M and $m_s$ | | | |
|---|---|---|---|---|
| | P = 10% | P = 5% | P = 1% | P = 0.2% |
| 24 | 1.71 | 2.07 | 2.81 | 3.48 |
| 25 | 1.71 | 2.06 | 2.80 | 3.47 |
| 26 | 1.71 | 2.06 | 2.79 | 3.45 |
| 27 | 1.71 | 2.06 | 2.78 | 3.44 |
| 28 | 1.70 | 2.05 | 2.77 | 3.42 |
| 29 | 1.70 | 2.05 | 2.76 | 3.41 |
| 30 | 1.70 | 2.05 | 2.76 | 3.40 |
| 40 | 1.68 | 2.02 | 2.70 | 3.31 |
| 60 | 1.67 | 2 | 2.66 | 3.23 |
| 120 | 1.66 | 1.98 | 2.62 | 3.16 |
| >120 | 1.64 | 1.96 | 2.58 | 3.09 |

As illustrated in the examples below, the formula generally used to determine w values for the method and system of the present invention is Formula 2.

$$w = (\text{square root of } n_g)(M - m_s)/s_g \quad \text{Formula 2}$$

wherein $n_g$ = number of sets in the series of sets (that is, the series used to determine $s_g$)

$m_s$ = mean of the sample measurements within a set $s_g$ = standard deviation of the "at large group" (defined below, in which definition s is standard deviation of the sample measurements within the set)

M = either the mean of a large parent group or the normalized mean

Since the standard deviation of a large parent group ($s_p$) might be used, although such circumstances is now believed likely to occur only rarely in the highest-value application of the present method and system, the formula for determining the w value in broad embodiment of the invention expands from Formula 2 to Formula 2.1:

$$w = (\text{square root of } n_g)(M - m_s)/(s_g \text{ or } s_p) \quad \text{Formula 2.1}$$

wherein $n_g$ = number of sets in the series of sets (that is, the series used to determine $s_g$)

$m_s$ = mean of the sample measurements within a set $s_g$ = standard deviation of the "at large group" (defined below)

$s_p$ = standard deviation of a large parent group

M = either the mean of a large parent group or the normalized mean

The standard deviation of the at large group is determined substantially by considering each set of sample measurements within a series as if it were itself a single measurement, the value of which is the mean of the set ($m_s$). The "mean" of the series (at large groups), or $m_g$, then is the combined means of the sets in the series divided by the number of sets in the series. A deviation value for each set, which is designated here as $d_g$, is determined by subtracting the "mean of the series ($m_g$) from the mean of the set, $m_s$. The at-large-group standard deviation is calculated using Formula 3.

$$s_g = \text{square root of } [(d_{gt}^2 - [d_{gc}]^2/n_g)/(n_g - 1)] \quad \text{Formula 3}$$

wherein $d_{gt}^2$ is the cumulative totals of the square of the individual $d_g$ values of the sets wherein $d_{gc}$ is the cumulative totals of the individual $d_g$ values of the sets wherein $d_g$ is the difference between $m_s$ and the mean of the $m_s$ values of the sets within the series that encompasses the set being process and wherein $n_g$ is as defined above in Formula 2.

In an operating industrial system, or one that is being put on-line, the value of $M_p$, the mean of a large parent group, might be unknown. When the parent group mean is unknown or is believed obsolete, a possible step, stage and/or procedure in the present method and system is the designation of a normalized mean. For instance, after the division of sequential measurements into a series of measurement sets, the mean value most often seen within the sets can be designated as the normalized mean. In an example of a preferred embodiment, for a given operating parameter, the "normalized mean" is the mean value that most frequently is seen within the series. Other techniques internal or external to the method and/or system of the present invention can be used to determine and designate a normalized mean, that is a mean that at least approximates or approaches the current operating mean of the parameter of interest. This "normalized mean" may used in the above Formula 2 as M, or M can be the mean of the large parent group, for instance the variable designated as $M_p$ above in Formula 1 for the conventional Student's t test. The $M_p$ concept is that the number of measurements used to determine the parent group mean is infinite and/or all-embracing, or approaches or approximates an infinite and/or all embracing number of measurements. If a substantially constant value is seen for a given parameter when a physical system is operating under substantially constant and/or equilibrium conditions, and if there is no reason to believe or suspect that such operating condition is abnormal, that substantially constant value can be designated a parent mean although it is determined by observation of far less than an infinite number of samples. While distinctions between a parent mean and a normalized mean become dimmed when the value is based upon prevailing operating conditions, the fact that such a mean can be used, and at times is preferred, provides a significant advantage. An external parent mean, that is a mean determined not only external to the present method but also external to prevailing operating conditions, can nonetheless be used. Such an external parent mean might be one determined by a manufacturer for its entire production of a given model of physical systems, in which instance the parent mean can be considered external of even the specific physical system on which the present method is worked. Such an external parent mean is within the category of parent group mean or parent mean as this terminology is used herein.

As indicated from the above definition and description of Formula 2, the w value determined is a value for an entire set, and not for any individual measurement within a set.

In the following examples, the method and system of the present invention determined whether or not the values within each set were (a) probably within good operating range (condition N0), (b) probably approaching a point outside of good operating range condition (condition Nx), or (c) entering the range of possible failure (condition N1), using the following N0, Nx and N1 definitions:

(1) An N0 condition exists when the set's "w" is less than "n5" wherein "n5" is the w value consistent with 5% probability of no significant difference between M and $m_s$ on the w Table for "$n_g$" number of samples.

(2) An Nx condition exists when the set's "w" is greater than "n5" (defined above) but less than "n1" wherein "n1" is the w value consistent with 1% probability of no significant difference between M and $m_s$ on the w Table for "$n_g$" number of samples.

(3) An N1 condition exists when the set's "w" is greater than "n1" (defined above).

As mentioned elsewhere, when the method and/or system of the present invention determines that an errant fluctuation of operating parameter is significant, or not merely due to chance, a signal or other notification is given warning that system maintenance is required to forestall system failure or other system problems.

EXAMPLE 1

A Wheatstone bridge was employed to demonstrate the capabilities of the invention. A Wheatstone bridge is a network of resistances used for the comparison of an unknown electrical resistance with a known resistance. As shown in FIG. 1, the Wheatstone bridge 50 used was comprised of circuitry including a first, second, third and fourth circuit resistors 51, 52, 53, 54, a battery 56, a shunt resistor 58 and a galvanometer or multimeter 60. Certain points or junctions in the circuits are designated a, b, c and d in FIG. 1. As shown, a first or primary circuit can be designated as running from the battery 56 to point a, through the third resistor 53 to point c, through the fourth resistor 54 to point d, and then back to the battery 56. In parallel with the first circuit is a second or secondary circuit running from point a through the first resistor 51 and the second resistor 52 to point d. The multimeter 60 bridges the primary and secondary circuits between points b and c. In the normal use of the Wheatstone bridge, for example, the first resistor 51, the second resistor 52, and the third resistor 53 are adjusted so that the multimeter 60 registers no current through it, points b and c are at the same potential, and the resistance of the third resistor 53 can be determined from formula "R3=R4 (R1/R2)" wherein R1, R2, R3 and R4 are respectively the resistances of the first, second, third and fourth resistors 51, 52, 53, 54. The Wheatstone bridge was not employed in the test of this Example 1 for the purpose of determining an unknown resistance, but instead was used as a system in which the value of the electrical current could be changed at will without jeopardizing an actual operating system or the structural elements thereof. In this Example 1, the first and fourth resistors 51, 54 were variable resistors. The second resistor 52 had a fixed resistance of 14.8 ohms. The third resistor 53 had a fixed resistance of 7 kilohms. The Wheatstone bridge was set at a zero multimeter reading by adjusting the first and fourth resistors 51, 54. The zero voltage current or voltage reading was designated the parent mean or normalized mean for this system, which serves as a generic physical system, such as electrical or mechanical device or instrument, for the purposes of this Example 1. Then a series of manual changes were made to the variable resistors, that is to the first and fourth resistors 51, 54, and a series of multimeter readings were observed and manually recorded. For the purposes of this Example 1, there was no need to record the multimeter reading after each change of a resistor, but in order to simulate a computer-implemented recording of an operating system parameter at set time intervals, the multimeter reading was recorded after about every adjustment of one of the two variable resistors. There were twenty-five multimeter readings (samples) within each set or group, and the series comprised five 25-sample sets. These sets are designated respectively in sequential order as Set 1-1, 1-2, 1-3, 1-4 and 1-5. The value of zero (discussed elsewhere) was used as a parent mean or M in Formula 2. The multimeter readings and determinations of w and the existing "N" condition are detailed here for the first 25-sample set, Set 1-1. In Table 2 is shown the multimeter readings for each of the twenty-five samples in each set plus the combined total value of the measurements in each set and the calculated mean for each set, which are values preliminary to the calculation of w for each set.

TABLE 2

Wheatstone bridge Test, parameter measured was multimeter current, n = 25

| Sample Designation | "x" Multimeter Reading (V) | | | | |
|---|---|---|---|---|---|
| | Set 1-1 | Set 1-2 | Set 1-3 | Set 1-4 | Set 1-5 |
| 1 | 0 | 0 | 0 | 0 | 0 |
| 2 | −0.002 | −0.002 | −0.002 | 0.002 | −0.002 |
| 3 | 0.003 | 0.004 | 0.005 | 0.012 | 0.022 |
| 4 | 0 | 0.268 | 0.24 | 0.62 | 0.309 |
| 5 | 0.011 | −0.001 | 0.002 | 0.234 | 0.06 |
| 6 | 0.01 | −0.002 | −0.001 | 0.005 | 0.24 |
| 7 | 0.015 | 0.01 | 0.078 | 0.012 | 1.792 |
| 8 | 0.003 | 0.347 | 0.465 | 0.573 | 0.006 |
| 9 | 0.01 | 0.005 | 0 | 0.213 | 0.004 |
| 10 | 0.016 | −0.002 | 0.002 | 0 | 1.034 |
| 11 | 0.013 | 0.014 | 0.01 | 0.004 | 2.9 |
| 12 | 0.017 | 0.713 | 0.366 | 0.61 | 0.003 |
| 13 | 0.01 | 0.001 | 0 | 0.397 | 0.001 |
| 14 | 0.016 | 0.002 | 0.008 | 1.5 | 1.472 |
| 15 | 0.014 | 0.003 | 2.74 | 2.78 | 2.22 |
| 16 | 0.018 | 0.006 | 0.026 | 0.772 | 0.435 |
| 17 | 0.013 | 0.002 | 0.178 | 0.418 | 0.338 |
| 18 | 0.019 | 0.654 | 0.009 | 0.012 | 0.004 |
| 19 | 0.008 | 2.3 | 0.013 | 0.02 | 0.004 |
| 20 | −0.002 | 0.416 | 0.389 | 0.977 | 0.703 |
| 21 | 0.011 | 0.155 | 0.229 | 0.312 | 0 |
| 22 | 0.016 | 0.003 | 0.003 | 0.145 | 0.001 |
| 23 | 0.01 | 0.007 | 0.006 | 0.39 | 0.025 |
| 24 | 0.028 | 0.665 | 0.582 | 0.807 | 0.537 |
| 25 | 0.025 | 0.004 | 0.16 | 0.001 | 0.001 |
| Totals ("x-total") | 0.282 | 5.572 | 5.508 | 10.816 | 12.109 |
| $m_s$ (x-total/25) | 0.01128 | 0.22288 | 0.22032 | 0.43264 | 0.48436 |

The $s_g$ value (standard deviation of "at large" groups) was based on the five 25-sample sets. To illustrate the determination of the $s_g$ (standard deviation for "at large" groups), which is then used to determine the "w" for each of these sets, reference is made to Table 3 The reference designations of "$m_s$" and/or "$x_g$" denominate the mean of the sets individually for clarity. The reference designation of "$n_g$" denominates the "number of samples" when the sets are being considered the "samples". The $s_g$ (standard deviation of at large groups) was calculated as follows:

TABLE 3

Wheatstone bridge Test - parameter measured was multimeter current - "normalized mean" (M) of zero, n = 25, $n_g$ = 5

| Set Designation | $m_s$ or $x_g$ [Total Multimeter Readings ($x_t$) in Volts divided by n] | deduction therefrom (minus $m_g$) | $d_g$ ($x_g - m_g$) | $d_g^2$ |
|---|---|---|---|---|
| 1-1 | 0.01 | −0.27 | −0.26 | 0.07 |
| 1-2 | 0.22 | −0.27 | −0.05 | 0 |
| 1-3 | 0.22 | −0.27 | −0.05 | 0 |

TABLE 3-continued

Wheatstone bridge Test - parameter measured was
multimeter current - "normalized mean"
(M) of zero, n = 25, $n_g$ = 5

| Set Designation | $m_s$ or $x_g$ [Total Multimeter Readings ($x_t$) in Volts divided by n] | deduction therefrom (minus $m_g$) | $d_g$ ($x_g - m_g$) | $d_g^2$ |
|---|---|---|---|---|
| 1-4 | 0.43 | −0.27 | 0.16 | 0.03 |
| 1-5 | 0.48 | −0.27 | 0.21 | 0.04 |
| totals | 1.36 | | 0.01 | 0.14 |
| $m_g$ (total x/5) | 0.27 | | | |

After rounding off the value of $d_{gt}^2$ to 0.1439, rather than the further rounded off value of 0.14 as shown above, and deleting the "$(d_{gc})^2/5$" value as being too small to be significant, the at large standard deviation ("$s_g$") for the series containing Sets 1-1 through 1-5 was determined by Formula 3 as follows:

$$s_g = \text{square root of } [(d_{gt}^2 - [d_{gc}]^2/n_g)/(n_g - 1)]$$

or $$s_g = \text{square root of } [(0.1439/4) = \text{square root of } 0.035975 = 0.1897$$

The formula for determining w again is Formula 2, that is $w = (\text{square root of } n_g)(M - m_s)s_g$. The preliminary calculated values, w values and N conditions determined therefrom for each of the five sets are shown in Table 4 below.

TABLE 4

Wheatstone bridge Test - parameter measured was
multimeter current - "normalized mean"
(M) of zero, $n_g$ = 5, square root of $n_g$ = 2.236, $s_g$ = 0.1897

| Set | $x_g$ or $m_s$ [Total Multimeter Readings (x) in Volts divided by n (25)] | 2.236 $m_s$ | w (w = 2.236 $m_s$/ 0.1897) | Condition Determined n5 = 2.78, n1 = 4.6 |
|---|---|---|---|---|
| 1-1 | 0.01128 | 0.0252 | 0.13 | N0 |
| 1-2 | 0.22288 | 0.4982 | 2.62 | N0 |
| 1-3 | 0.22032 | 0.4926 | 2.6 | N0 |
| 1-4 | 0.43264 | 0.9674 | 5.1 | N1 |
| 1-5 | 0.48436 | 1.083 | 5.7 | N1 |

As was seen in Table 2, greater resistor adjustments were made beginning with Set 1-2. If the individual sets here were each designated a series with the individual measurements being designated as sets, the conditions determined in Set 1-2 would include N1 conditions. If there are considerable swings around the M in the parameter being tracked, the "w" values for the individual measurements do not provide meaningful predictive information. The present invention overcomes this problem, for instance where the sets are grouped as illustrated as in Example 1 wherein an "at large" standard deviation that encompasses all of the 125 samples was used, and each of the five sets were treated as individual samples. This widening or stepping up a level provided w values that were meaningful and predictive.

As can be seen from Table 1, and as empirically demonstrated in Example 1, regardless of the number of samples in a given set, the value of "n5" is always less than the value of "n1", and thus since $$n5 < n1$$

if $w < n5$, then $w < n5 < n1$ and therefore when an N0 condition exists as shown above, an Nx condition cannot exist, nor can an N1 condition exist. The same is true for each condition, which are mutually exclusive. Thus when it is determined that one of the three conditions exists, there is no practical reason to continue the analysis as to the possibility of any other condition existing.

EXAMPLE 2

In Example 2, the first four sets of the Wheatstone bridge resistor-adjustment test described in Example 1 were relabeled as Sets 2-1, 2-2, 2-3, and 2-4. In this Example 2 the fifth set was deleted to demonstrate the effect of limiting the number of sets in a series when there are wide swings around the parent mean. The comparisons provided by the various Examples in which different groupings of sets were taken as a series demonstrate the need for modeling on actual physical systems, including a determination of the number of sequential sets to be taken as a series for the determination of w values of each set. For this Example 2, the $s_g$ (standard deviation for the four sets in the series), which is then used to determine the "w" for each of these sets, is shown in Table 5 below.

TABLE 5

Wheatstone bridge Test - parameter measured was
multimeter current - "normalized mean"
(M) of zero, n = 25, $n_g$ = 4

| Set Designation | $m_s$ or $x_g$ [Total Multimeter Readings ($x_t$) in Volts divided by n] | minus $m_g$ | $d_g$ ($x_g - m_g$) | $d_g^2$ |
|---|---|---|---|---|
| 2-1 | 0.01128 | −0.22178 | −0.2105 | 0.0443 |
| 2-2 | 0.22288 | −0.22178 | 0.0011 | 0.0000012 |
| 2-3 | 0.22032 | −0.22178 | −0.00146 | 0.0000021 |
| 2-4 | 0.43264 | −0.22178 | 0.21086 | 0.0444 |
| totals | 0.88712 | | 0 | 0.0887033 |
| $m_g$ (total x/4) | 0.22178 | | | |

After rounding off the value of $d_{gt}^2$ to 0.089, and deleting the "$(d_{gc})^2/4$" value as being too small to be significant, the at large standard deviation ("$s_g$") for Sets 2-1 through 2-4 was determined by Formula 3 of $s_g = \text{square root of } [(d_{gt}^2 - [d_{gc}]^2/n_g)/(n_g - 1)]$ or $$s_g = \text{square root of } (0.089/3) = \text{square root of } . = 0.172$$

Using the $s_g$ of 0.172, the $n_g$ of 4, and the Formula 2 for determining w, that is $w = (\text{square root of } n_g)(M - m_s)/s_g$, w values for each of the four sets were determined as shown in Table 6 below:

TABLE 6

Wheatstone bridge Test - parameter measured was
multimeter current - "normalized mean"
(M) of zero, $n_g$ = 4, square root of $n_g$ = 2, $s_g$ = 0.172

| Set | $x_g$ or $m_s$ [Total Multimeter Readings (x) in Volts divided by n (25)] | 2$m_s$ | w (w = 2$m_s$/ 0.172) | Condition Determined n5 = 3.18, n1 = 5.84 |
|---|---|---|---|---|
| 2-1 | 0.01128 | 0.02256 | 0.13 | N0 |
| 2-2 | 0.22288 | 0.44576 | 2.24 | N0 |
| 2-3 | 0.22032 | 0.44064 | 2.56 | N0 |
| 2-4 | 0.43264 | 0.86528 | 5.03 | Nx |

The condition of Nx was determined for Set 2-4 in this Example 2, while that same set in Example 1 (designated there as Set 1-4), was determined to have the more serious condition of N1. This divergence of results based on the groupings of sets in a series for evaluation illustrates the individual modeling that might be required for any given physical system or type of physical system.

EXAMPLE 3

In Example 3, the five sets of the Wheatstone bridge resistor-adjustment test described in Example 1 were relabeled as Sets 3-1, 3-2, 3-3, 3-4 and 3-5. A formulated sequential sixth set, Set 3-6, was added to this group of sets to form a new series. Set 3-6 had more extreme swings than could be practically produced on the Wheatstone bridge apparatus. The devised readings and mean value for Set 3-6 are shown in Table 7.

TABLE 7

Wheatstone bridge Test, parameter devised was multimeter current, n = 25

| Sample Designation | "x" Devised Multimeter Reading (V) for Set 3–6 |
|---|---|
| 1 | 1.6 |
| 2 | 0.799 |
| 3 | 0.003 |
| 4 | 0.005 |
| 5 | 4.71 |
| 6 | 1.61 |
| 7 | 0 |
| 8 | 0.001 |
| 9 | 4.29 |
| 10 | 2.04 |
| 11 | 1.325 |
| 12 | 2.57 |
| 13 | 4.71 |
| 14 | 2.33 |
| 15 | 1.83 |
| 16 | 0.171 |
| 17 | 0.18 |
| 18 | 4.71 |
| 19 | 2.62 |
| 20 | 0.781 |
| 21 | 1.123 |
| 22 | 4.7 |
| 23 | 3.1 |
| 24 | 1.26 |
| 25 | 1.65 |
| Totals | 48.118 |
| $m_s$(x-totals/25) | 1.92472 |

The $s_g$ (standard deviation for the six sets comprising the "at large" group or series), which is then used to determine the "w" for each of these sets, was determined to be 0.795. The "w" values and conditions determined for each of the sets in the series are shown below in Table 8.

TABLE 8

Wheatstone bridge Test - parameter measured was multimeter current - "normalized mean" (M) of zero, $n_g$ = 6, square root of $n_g$ = 2.45, $s_g$ = 0.795

| Set | $m_s$ [Total Multimeter Readings (x) in Volts divided by n of 25] | w (2.45 $m_s$/ 0.549) | Condition Determined n5 = 2.57, n1 = 4.03 |
|---|---|---|---|
| 3–1 | 0.01128 | 0.03 | N0 |
| 3–2 | 0.22288 | 0.69 | N0 |
| 3–3 | 0.22032 | 0.68 | N0 |
| 3–4 | 0.43264 | 1.33 | N0 |
| 3–5 | 0.48436 | 1.49 | N0 |
| 3–6 | 1.92472 | 5.93 | N1 |

EXAMPLE 4

In Example 4, the six sets of the Wheatstone bridge resistor-adjustment test described in Example 3 were relabeled as Sets 4-1, 4-2, 4-3, 4-4, 4-5 and 4-6. Three additional devised 25-sample sets, designated Sets 4-7, 4-8 and 49, were added to form a nine-set series. The formulated readings and mean value for Sets 4-7, 4-8 and 4-9 are shown in Table 9.

TABLE 9

Wheatstone bridge Test, parameter measured was multimeter current, n = 25

| Sample Designation | "x" Multimeter Reading (V) | | |
|---|---|---|---|
| | Set 4–7 | Set 4–8 | Set 4–9 |
| 1 | −0.002 | −5 | −5 |
| 2 | −0.002 | −5 | −4.5 |
| 3 | −0.001 | −5 | −3 |
| 4 | −0.001 | −5 | −2.5 |
| 5 | −0.002 | −5 | −2 |
| 6 | −0.002 | −5 | −1.5 |
| 7 | 0.005 | −5 | −1 |
| 8 | 1.041 | −5 | −0.5 |
| 9 | 1.39 | −5 | −0.25 |
| 10 | 0.002 | −5 | −0.125 |
| 11 | 0.002 | −5 | −0.0625 |
| 12 | 0.01 | −5 | −0.00313 |
| 13 | 0.01 | 0 | 0 |
| 14 | 0.008 | 5 | 0.003125 |
| 15 | 0.008 | 5 | 0.0625 |
| 16 | 0.136 | 5 | 0.125 |
| 17 | 0.128 | 5 | 0.25 |
| 18 | 0.006 | 5 | 0.5 |
| 19 | −0.002 | 5 | 1 |
| 20 | 0.004 | 5 | 1.5 |
| 21 | 0.478 | 5 | 2 |
| 22 | 0.005 | 5 | 2.5 |
| 23 | −0.002 | 5 | 3 |
| 24 | 0.002 | 5 | 3.5 |
| 25 | 0.448 | 5 | 4 |
| Totals | 3.669 | 0 | −2.000005 |
| $m_s$(x-total/25) | 0.14676 | 0 | 0.08 |

The $s_g$ (standard deviation for the six sets comprising the series of this Example 4), which was then used to determine the "w" for each of the sets, was determined to be 0.901123, based on calculations that $d_{gc}$ was −1.32416 and $d_{gt}^2$ was 6.691008. The "w" values and conditions determined for each of Sets 4-1 through 4-9 are shown below in Table 10.

TABLE 10

Wheatstone bridge Test - parameter measured was multimeter current parent mean (M) of zero, $n_g$ = 9, square root of $n_g$ = 3, $s_g$ = 0.901

| Set | $m_s$ [Total Multimeter Readings (x) in Volts divided by n (25)] | w (w = 3 $m_s$/0.901) | Condition Determined n5 = 2.31, n1 = 3.36 |
|---|---|---|---|
| 4–1 | 0.01128 | 0.04 | N0 |
| 4–2 | 0.22288 | 0.74 | N0 |
| 4–3 | 0.22032 | 0.73 | N0 |
| 4–4 | 0.43264 | 1.42 | N0 |
| 4–5 | 0.48436 | 1.61 | N0 |
| 4–6 | 1.92472 | 6.41 | N1 |
| 4–7 | 0.14676 | 0.49 | N0 |
| 4–8 | 0 | 0 | N0 |
| 4–9 | 0.08 | 0.27 | N0 |

COMPARATIVE EXAMPLE 5

For comparison, the N condition for the first Wheatstone bridge 25-sample set was here determined in isolation using the standard deviation of the set instead of $s_g$, the standard deviation of a series. As shown in Table 2 of Example 1 above, the combined values of the 25 measurements within Set 1-1 is 0.282, and the mean of the set is 0.01128. The d and $d^2$ values for each sample were calculated by subtracting the $s_g$ value of 0.1128 from each measurement (the differences being d values), squaring the twenty-five d values separately, and combining the separate $d^2$ values to obtain a cumulative $d^2$ value of 0.001461. These computations are shown in Table 11 below.

TABLE 11

Wheatstone bridge Test - parameter measured was multimeter current parent mean (M) of zero, n = 25

| Sample Designation | "x" Multimeter Reading (V) | minus x-total/n | "d" = x minus x-total/n | $d^2$ | $w_m$ |
|---|---|---|---|---|---|
| 1 | 0 | −0.01128 | −0.01128 | 0.000127238 | 0 |
| 2 | −0.002 | −0.01128 | −0.01328 | 0.000176358 | 1.2 |
| 3 | 0.003 | −0.01128 | −0.00828 | 0.000068558 | 1.9 |
| 4 | 0 | −0.01128 | −0.01128 | 0.000127238 | 0 |
| 5 | 0.011 | −0.01128 | −0.00028 | 0.000000784 | 6.9 |
| 6 | 0.01 | −0.01128 | −0.00128 | 0.000016384 | 6.2 |
| 7 | 0.015 | −0.01128 | 0.00372 | 0.000013838 | 9.4 |
| 8 | 0.003 | −0.01128 | −0.00828 | 0.000068558 | 1.9 |
| 9 | 0.01 | −0.01128 | −0.00128 | 0.000016384 | 6.2 |
| 10 | 0.016 | −0.01128 | 0.00472 | 0.000022278 | 10 |
| 11 | 0.013 | −0.01128 | 0.00172 | 0.000029584 | 8.1 |
| 12 | 0.017 | −0.01128 | 0.00572 | 0.000032718 | 10.6 |
| 13 | 0.01 | −0.01128 | −0.00128 | 0.000016384 | 6.25 |
| 14 | 0.016 | −0.01128 | 0.00472 | 0.000022278 | 10 |
| 15 | 0.014 | −0.01128 | 0.00272 | 0.000073984 | 8.75 |
| 16 | 0.018 | −0.01128 | 0.00672 | 0.000045158 | 11.2 |
| 17 | 0.013 | −0.01128 | 0.00172 | 0.000029584 | 8.1 |
| 18 | 0.019 | −0.01128 | 0.00772 | 0.000059598 | 11.9 |
| 19 | 0.008 | −0.01128 | −0.00328 | 0.000010758 | 5 |
| 20 | −0.002 | −0.01128 | −0.01328 | 0.000176358 | 1.2 |
| 21 | 0.011 | −0.01128 | −0.00028 | 0.000000784 | 6.9 |
| 22 | 0.016 | −0.01128 | 0.00472 | 0.000022278 | 10 |
| 23 | 0.01 | −0.01128 | −0.00128 | 0.000016384 | 6.2 |
| 24 | 0.028 | −0.01128 | 0.01672 | 0.000279558 | 17.5 |
| 25 | 0.025 | −0.01128 | 0.01372 | 0.000188238 | 15.6 |
| Totals | 0.282 | | | 0.0014610336 | |
| $m_s$ (x-total/n) | 0.01128 | | | | |

After rounding off the value of $d^2$ to 0.001461, the standard deviation ("s") for Set 1-1 was determined by the formula $s$=square root of $[(d^2\text{-total}-[d\text{-total}]^2/n)/(n-1)]$ or $s$=square root of 0.001461/24 (the value of $[d\text{-total}]^2/n$ approaching zero)

or square root of 0.00000608=0.00780235

The "w" for Set 1-1 in isolation was determined by the formula $w$=(square root of $n$)($M-m$)/$s$ or w=[(square root of 25)(0−0.01128)]/0.00780235=(5)(−0.01128)/0.00780235=7.2

Since the square root of 25 is 5, the "w" value for Set 1-1 would be 7.2. For any set comprising twenty-five samples, n5 is 2.06 and n1 is 2.80. Thus if the w for Set 1-1 was determined using "s" rather than "$s_g$", an N1 condition would be indicated because 7.2 is greater than the n1 of 2.80. In contrast, in Example 1 using the five sets as "samples", Set 1-1's N condition was determined to be an N0 condition. Since the fluctuations from the parent mean of zero are very minor in this Set 1-1 in comparison to subsequent sets, an N0 condition is plausible, while the N1 condition determined in this Comparative Example 5 is not credible. When alternatively a w value for each individual measurement is determined, which is shown in Table 11 under the designation of $w_m$, the first four measurements show an N0 condition, which condition jumps to N1 at measurement 5 and remains up at N1 for almost all subsequent measurements. These results again are not credible and do not reflect the operating condition of the system.

HYPOTHETICAL EXAMPLE 6

The similarities and/or correspondences between a Wheatstone bridge and many transducer devices enabled a facile development of a methodology for utilizing the present invention's predictive method on sensors. A transducer is a device that is actuated by power from one system and that supplies or impacts power in another form to a second system. Many types of sensors or gauges comprise or include a transducer wherein the property being measured is changed into, or reflected by an electrical signal by way of a change in a resistance zone in an electrical circuit. For instance, a "hot wire semiconductor" gas-detection sensor measures the change in the electrical conductivity of a circuit element, that is, a gas sensor element having a heated metal wire with a metal oxide semiconductor coating. The change in electrical conductivity is initiated by the adsorption of a target gas onto the surface of the metal-oxide coating, whereby adsorption of gases that act as reducing agents causes a resistance decrease while adsorption of oxidation-agent gases increases the resistance. The resistance, and the changes in the resistance of the gas sensor element are determined by a Wheatstone bridge circuit, as elucidated in Example 1 above. The impact of physical conditions on the resistance of a sensor element is the foundation for many other transducer devices, including without limitation strain gauges, thermocouple devices, load cells and the like. The hypothetical transducer device selected for this Example 6 is a pressure gauge having an operating range of from 1 to 1,000 psi and an output voltage of 0 to 5 volts DC. The relation between pressure and the gauge's output voltage might be linear or nonlinear. The methodology that was established for the Wheatstone bridge simulations used the Wheatstone bridge as an operating system. In this Example 6 the present invention's predictive method evaluates the hypothetical pressure gauge by tracking its electrical output which in turn follows the pressure fluctuations within a second operational system. The variations in pressure of the second operational system must be eliminated if the performance of the pressure gauge itself is to be determined, and this elimination was accomplished by the employment of a pair of pressure gauges both following the same second operational system. The values sampled were not the voltage output of either gauge but the difference between the voltage outputs at set time intervals. The hypothetical gauges are instruments of identical manufacture having the following specifications: non-repeatability maximums of 0.2% and 1% accuracy full scale. For simplicity the gauges of this hypothetical example require no calibrations or other corrective scale modifications. Six sets of 25 samples were devised for this Example 6. The first set, Set 6-1, represents "ideal factory" data showing a consistent differential between voltage outputs. Set 6-2 represents field data taken some time after installation and continued use of the gauges wherein the output differentials no longer are consistent. The subsequent and sequential four sets are field data on which has been imposed a five percent increase over the correlative sample of the prior set. The consistent differentials between voltage outputs of the first set, Set 6-1, are taken as the parent group mean, which is represented by the value of zero because the actual value of 0.0000009 is essentially zero. The values and $m_s$ for all six sets are shown below in Table 12, and the influence of set groupings on the determination of N conditions are shown and discussed thereafter.

TABLE 12

Transducer Hypothetical Test, parameter measured was voltage output differential between two pressure gauges, n = 25

"x" = Voltage Output Differential (V)

| Sample | Set 6-1 | Set 6-2 | Set 6-3 | Set 6-4 | Set 6-5 | Set 6-6 |
|---|---|---|---|---|---|---|
| 1 | 0.0000009 | 0.0000009 | 0.00000095 | 0.00000099 | 0.000001 | 0.0000011 |
| 2 | 0.0000009 | 0.000011 | 0.000011 | 0.000012 | 0.000013 | 0.000013 |
| 3 | 0.0000009 | 0.000021 | 0.000022 | 0.000023 | 0.000024 | 0.000025 |
| 4 | 0.0000009 | 0.000031 | 0.000032 | 0.000034 | 0.000036 | 0.000038 |
| 5 | 0.0000009 | 0.000041 | 0.000043 | 0.000045 | 0.000047 | 0.00005 |
| 6 | 0.0000009 | 0.000051 | 0.000053 | 0.000056 | 0.000059 | 0.000062 |
| 7 | 0.0000009 | 0.000061 | 0.000064 | 0.000067 | 0.00007 | 0.000074 |
| 8 | 0.0000009 | 0.000071 | 0.000074 | 0.000078 | 0.000082 | 0.000086 |
| 9 | 0.0000009 | 0.000081 | 0.000085 | 0.000089 | 0.000094 | 0.000098 |
| 10 | 0.0000009 | 0.000091 | 0.000095 | 0.0001 | 0.000105 | 0.00011 |
| 11 | 0.0000009 | 0.000101 | 0.000106 | 0.000111 | 0.000117 | 0.000123 |
| 12 | 0.0000009 | 0.000111 | 0.000116 | 0.000122 | 0.000128 | 0.000135 |
| 13 | 0.0000009 | 0.000121 | 0.000127 | 0.000133 | 0.00014 | 0.000147 |
| 14 | 0.0000009 | 0.000131 | 0.000137 | 0.000144 | 0.000152 | 0.000159 |
| 15 | 0.0000009 | 0.000141 | 0.000148 | 0.000155 | 0.000163 | 0.000171 |
| 16 | 0.0000009 | 0.000151 | 0.000158 | 0.000166 | 0.000175 | 0.000183 |
| 17 | 0.0000009 | 0.000161 | 0.000169 | 0.000177 | 0.000186 | 0.000196 |
| 18 | 0.0000009 | 0.000171 | 0.000179 | 0.000188 | 0.000198 | 0.000208 |
| 19 | 0.0000009 | 0.000181 | 0.00019 | 0.000199 | 0.000209 | 0.00022 |
| 20 | 0.0000009 | 0.000191 | 0.0002 | 0.00021 | 0.000221 | 0.000232 |
| 21 | 0.0000009 | 0.000201 | 0.000211 | 0.000221 | 0.000233 | 0.000244 |
| 22 | 0.0000009 | 0.000211 | 0.000221 | 0.000233 | 0.000244 | 0.000256 |
| 23 | 0.0000009 | 0.000221 | 0.000232 | 0.000244 | 0.000256 | 0.000269 |
| 24 | 0.0000009 | 0.000231 | 0.000242 | 0.000255 | 0.000267 | 0.000281 |
| 25 | 0.0000009 | 0.000241 | 0.000253 | 0.000266 | 0.000279 | 0.000293 |
| Totals | 0.0000225 | 0.0030249 | 0.00316895 | 0.00332899 | 0.003499 | 0.0036741 |
| $m_s$ | 0.0000009 | 0.000121 | 0.000127 | 0.000133 | 0.00014 | 0.000147 |

Data within the six sets were then evaluated in four "groups" or series, that is Series 1 comprising Sets 6-1 through 6-3, Series 2 comprising Sets 6-1 through 6-4, Series 3 comprising Sets 6-1 through 6-5, and Series 4 comprising Sets 6-1 through 6-6. For each series, the value of the series mean, standard deviation, the values of n5 and n1, and for each set within the series, the w value and the N condition indicated thereby, are set forth below in Table 13.

TABLE 13

(Parent Mean of 0)

| Set | w | N Condition |
|---|---|---|
| Series 1: series mean of 0.000112; standard deviation of .000106; n5 of 4.3; n1 of 9.92. | | |
| 6-1 | 0.01 | N0 |
| 6-2 | 1.97 | N0 |
| 6-3 | 3.47 | N0 |
| Series 2: series mean of 0.000096; standard deviation of 0.000093; n5 of 3.18; n1 of 5.84. | | |
| 6-1 | 0.02 | N0 |
| 6-2 | 2.59 | N0 |
| 6-3 | 2.72 | N0 |
| 6-4 | 2.86 | N0 |
| Series 3: series mean of 0.000104; standard deviation of | | |

TABLE 13-continued (Parent Mean of 0)

| Set | w | N Condition |
|---|---|---|
| 0.000104; n5 of 2.78; n1 of 4.6. | | |
| 6-1 | 0.02 | N0 |
| 6-2 | 3.21 | Nx |
| 6-3 | 3.37 | Nx |
| 6-4 | 3.54 | Nx |
| 6-5 | 3.72 | Nx |
| Series 4: series mean of 0.000111; standard deviation of 0.000078; n5 of 2.57; n1 of 4.03. | | |
| 6-1 | 0.03 | N0 |
| 6-2 | 3.8 | Nx |
| 6-3 | 3.99 | Nx |
| 6-4 | 4.19 | N1 |
| 6-5 | 4.4 | N1 |
| 6-6 | 4.62 | N1 |

EXAMPLE 7

The method and system of the present invention were demonstrated in the prediction of approaching system failure in a resistive electrical system. Resistive electrical circuits are sometimes employed by industry as process heaters. A simple low wattage heating coil designed to heat water provided an apt simulation of an industrial heating element because such coils are readily available and can be easily induced to fail by burning out without combustion or complete coil melt-down. A resistive circuit such as the heating coil used herein also provides a reasonable simulation of the electrical circuits of motors and generators which would differ only as to the type of wire employed and the number of windings. Because the coil used was rated for 36 volts, a transformer was employed to step-down the 120 volt input electrical power to 55 volts. The voltage monitoring was performed with a multimeter in a monitoring circuit connected in parallel to the coil's electric circuit. The readings on the multimeter were enhanced by the inclusion and 5% numbers from the w Table corresponding to the number of set "samples" in the given Series. These calculations are shown in detail in various other examples above, and thus are not illustrated again here. In Table 14 below there are shown the thirty-five one-second-interval multimeter readings, divided into seven five-measurement sets designated Set 7-1 through Set 7-7. Also shown for each set are (1) the mean ($m_s$) of the five measurements, and (2) the N condition of each set within the five different Series designated Series 3 though Series 7. As can be seen in Table 14, Series 3 is comprised of Set 7-1 through Set 7-3, Series 4 is comprised of Set 7-1 through Set 7-4, Series 5 is comprised of Set 7-1 through Set 7-5, and so forth.

TABLE 14

Heating Coil Test, parameter measured was voltage, n of each set = 5, parent mean of 3.02

| | "x" = Voltage each sample in set | | | | | | N Condition of Set | | | | |
|---|---|---|---|---|---|---|---|---|---|---|---|
| Set | 1 | 2 | 3 | 4 | 5 | $m_s$ | Series 3 | Series 4 | Series 5 | Series 6 | Series 7 |
| 7-1 | 3.02 | 3.03 | 3.02 | 3.01 | 3.01 | 3.018 | N0 | N0 | N0 | N0 | N0 |
| 7-2 | 3.00 | 3.00 | 3.00 | 3.00 | 3.01 | 3.002 | N0 | N0 | N0 | N0 | N0 |
| 7-3 | 3.00 | 3.00 | 3.00 | 2.99 | 2.98 | 2.994 | N0 | N0 | N0 | Nx | Nx |
| 7-4 | 2.98 | 2.98 | 2.98 | 2.97 | 2.97 | 2.976 | | Nx | Nx | N1 | N1 |
| 7-5 | 2.97 | 2.97 | 2.97 | 2.96 | 2.96 | 2.966 | | | N1 | N1 | N1 |
| 7-6 | 2.96 | 2.97 | 2.96 | 2.96 | 2.95 | 2.960 | | | | N1 | N1 |
| 7-7 | 2.95 | 2.95 | 2.95 | 2.95 | 2.94 | 2.948 | | | | | N1 | of an inductive transformer and AC-to-DC converting diodes in the monitoring circuit. The coil, immersed in tap water, was permitted to heat the water to its boiling point. The DC voltage measurements of the multimeter stabilized around 3.02±0.01 volts at the condition of continuous boiling of the water with the coil immersed. That equilibrium was reached within the first minute of continued boiling of the water, and at this equilibrium the voltage readings did not fluctuate beyond±0.01 volt range despite random changes in the external power-demands upon the input power circuit. The constant boiling condition was deemed the normal operating condition, and thus the 3.02 volt reading was selected as the parent mean of the voltage parameter. After an elapse of at least a 15 second at-equilibrium holding period, failure of the coil was produced by removing it from the boiling water. Multimeter readings were taken at one-second intervals over a 35 second time period starting at the moment the coil was removed from the boiling water. The point of catastrophic failure of the coil occurred at the 35 second point, at which moment a white plumb of smoke emanated from the sheath enclosing the coil at its electrical-connection end and an acrid smell of melting metal was discerned. The measurement readings were discontinued and the coil was reimmersed in the water to eliminate hazards. The standard deviations for each of the various series defined below were calculated using Formula 3 described above. The w values of each of the sets in each of the various series were calculated using Formula 2 described above. The w values were converted to N conditions using the "N0 when w is less than n5 . . . " formulation described above, selecting the 1%

The first warning of system failure appears in Series 4 comprising the first four sets that encompass the first twenty one-second-interval measurements. Series 4 of course came into existence only after the elapse of 20 seconds. The Nx-condition warning is seen again in Set 7-4 in Series 5. Series 5 also includes Set 7-5 that has an N1-condition. In Series 6 and 7 the Nx and first N1-condition warnings show up one set earlier, that is respectively in Sets 7-3 and 7-4. If the first warning, which is given by Set 7-4 in Series 4 upon the elapse of 15 seconds, is not heeded, that warning is confirmed by the respective Nx and N1 conditions of Sets 7-4 and 7-5 of Series 5. For the heating-coil operating system of this Example 7, actual physical deterioration of the heating coil was not observed until the elapse of 35 seconds after the coil was removed from the water. Therefore there was a possibility that the heating coil could have been rescued even if power cutoff were delayed until the conditions of the sets were seen in Series 6. The shift of the warning conditions forward in time seen in Series 6 is a pattern that in many instances reconfirms the reality of the system failure predicted in the earlier series.

EXAMPLE 8

The readings taken in Example 7's induced heating coil failure were employed to demonstrate the predictive warning of an approaching system failure when the series selected include a fixed number of sets, rather than cumulative sets. In this Example 8 the series are defined as the latest three sets, which series are designated respectively Series 1/3, Series 2/4, Series 3/5, Series 4/6 and Series 5/7. In this Example 8 Series 1/3 is exactly the same as Series 3 of Example 7. Series 2/4 is comprised of Set 7-2 through Set 7-4, and so forth. The N conditions indicated by this alternative method are shown in Table 15 below.

TABLE 15

Heating Coil Test, parameter measured was voltage, n of each set = 5, parent mean of 3.02

| | "x" = Voltage each sample in set | | | | | | N Condition of Set | | | |
|---|---|---|---|---|---|---|---|---|---|---|
| | | | | | | | Series | Series | Series | Series | Series |
| Set | 1 | 2 | 3 | 4 | 5 | $m_s$ | 1/3 | 2/4 | 3/5 | 4/6 | 5/7 |
| 7-1 | 3.02 | 3.03 | 3.02 | 3.01 | 3.01 | 3.018 | N0 | | | | |
| 7-2 | 3.00 | 3.00 | 3.00 | 3.00 | 3.01 | 3.002 | N0 | N0 | | | |
| 7-3 | 3.00 | 3.00 | 3.00 | 2.99 | 2.98 | 2.994 | N0 | N0 | N0 | | |
| 7-4 | 2.98 | 2.98 | 2.98 | 2.97 | 2.97 | 2.976 | | Nx | Nx | N1 | |
| 7-5 | 2.97 | 2.97 | 2.97 | 2.96 | 2.96 | 2.966 | | | Nx | N1 | N1 |
| 7-6 | 2.96 | 2.97 | 2.96 | 2.96 | 2.95 | 2.96 | | | | N1 | N1 |
| 7-7 | 2.95 | 2.95 | 2.95 | 2.95 | 2.94 | 2.948 | | | | | N1 |

The method of this Example 8 provides a first warning in Set 7-4 of Series 2/4, which warning is identical in degree and time to that seen in Series 4 of Example 7. The continued warnings of Series 3/5 remain in Nx condition in comparison of the N1 condition seen in Example 7, but the N1 conditions signaled in Series 4/6 and 5/7 appear in the same sets, to the extent the sets are within the series.

EXAMPLE 9

The readings taken in Example 7's induced heating coil failure were employed to demonstrate the predictive warning of an approaching system failure when the system of the present invention is set to display the cumulative N conditions for each set as time passes beyond that point and new series are generated. The series selected for this multi-reading display are the series defined in both Examples 7 and 8 for comparison. A single set, Set 7-4, is shown here for demonstration. The cumulative N conditions displayed by this alternative method are shown in Table 16 below.

TABLE 16

Heating Coil Test, parameter measured was voltage, n of each set = 5, parent mean of 3.02

| Time Elapse | N Conditions Displayed for Set 7-4 | |
|---|---|---|
| (sec.) | Example 7's Series Selection | Example 8's Series Selection |
| 20 | Nx | Nx |
| 25 | Nx,Nx | Nx,Nx |
| 30 | Nx,Nx,N1 | Nx,Nx,N1 |
| 35 | Nx,Nx,N1,N1 | Nx,Nx,N1 |

Using Example 8's series selection wherein each comprises a fixed number of sets will of course provide only a limited accumulation of information regarding each set. Nonetheless programming for a cumulative display such as that demonstrated in this Example 9 could be a valuable modeling choice even for a fixed-set-number series program.

EXAMPLE 10

Using the automation method of object, linking and embedding technology ("OLE") that is commercially available in the Windows operating system from Microsoft Corporation of Redman, Wash., a computer implementation of the method of the present invention was developed. The code for this implementation was developed in Borland International's OWL diction and in C++ programming language. The C++ code can be converted to an automated code. An automated code is developed so that the automated application can be run within and with another application, for instance a commercially available general-purpose data tracking software application available from Fluke Corporation of Everett, Wash. under the trademark of Data Logger. Other data tracking applications are believed to be suitable for such implementation, including without limitation data tracking software available from Allen Bradley, a division of Rockwell Software, of West Allis, Wis. Data values can be received via an analog-to-digital signal converter (A/D). In the running of the application to check the continuity of the code and to eliminate, the data was inputted via a computer key board into a data array in the program. The data used was that generated in the heating-coil test of Example 7 above. The print-outs of the above-mentioned C++ code file that list in appropriate sequence the instructions, routines, and other contents of the program described in this Example 10 is set forth herein after the description of the invention and before the claims.

HYPOTHETICAL EXAMPLE 11

Figure 2:
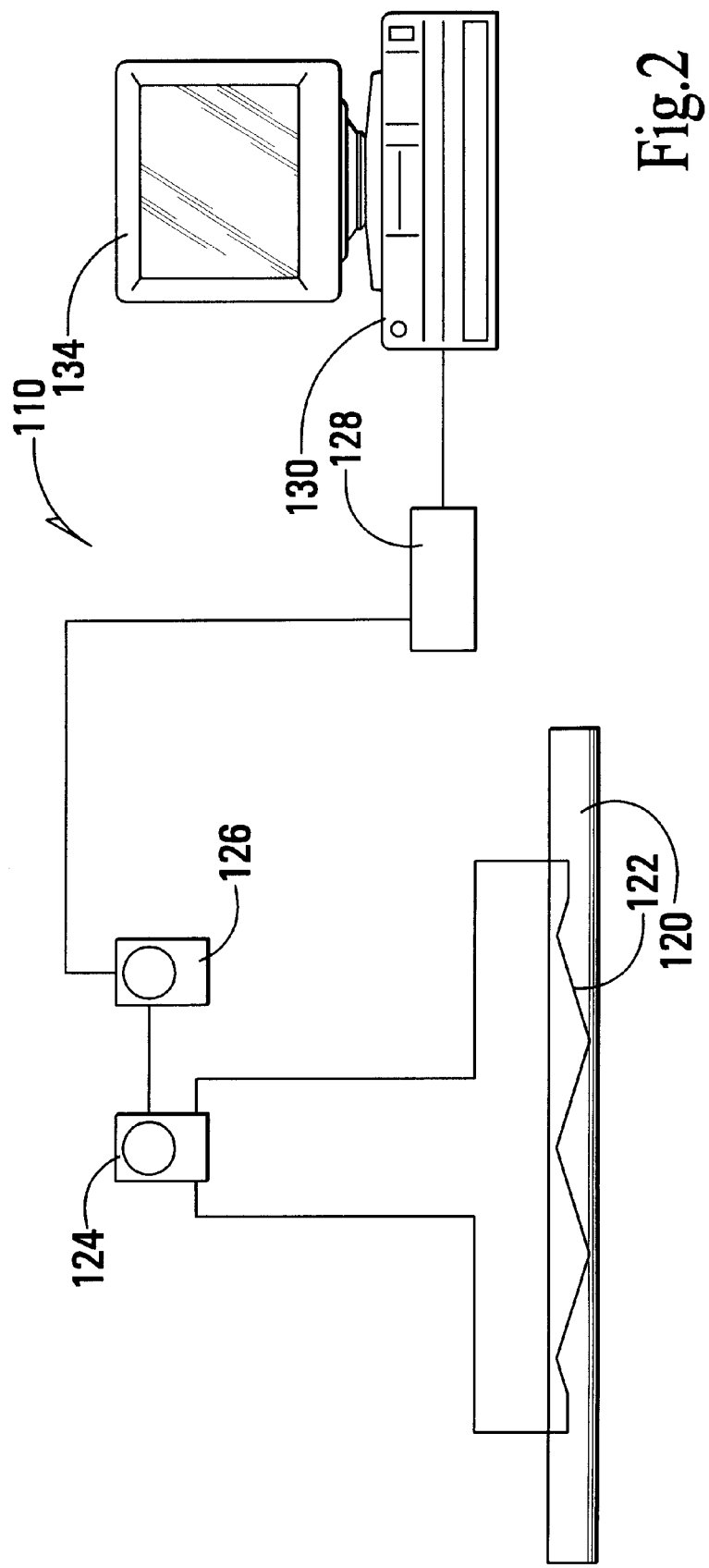
FIG. 2 is a flow diagram particularizing a computer-implemented system within the invention.

In FIG. 2 there is shown a flow diagram of a hypothetical computer implemented method and system using the application program describe in Example 10, which flow diagram is designated by the general reference number 110. Shown in flow diagram 110 is a pipe 120 through which industrial fluid is flowing. A heat tape 122 is mounted on the external surface of the pipe 120 to maintain the fluid within at the desired elevated temperature. The heat tape's control panel 124 reads the amperage drawn by the heat tape 122. A suitable control panel 124 is commercially available under the registered trademark of MoniTrace 1000 from Raychem Corporation of Menlo Park, Calif., or other equivalent devices could be used. The data is transmitted from the heat tape's control panel 124 to the AC current transducer 126. The amperage of the heat tape 122 is monitored and converted by an AC current transducer 126 that has an output of analog voltage (millivoltage) readings. The AC current transducer 126 can be one of several commercially available AC current transducers, such as those available from Fluke Corporation of Everett, Wash., or Ampro Instrument of Lynbrook, N.Y. The analog output of the transducer 126 is read and converted to binary by an A/D board 128. The general purpose tracking software, which can also be considered the A/D board enabling software, is operating in the computer 130 via the A/D board 128. The desktop computer 130 is equipped with a 486 or higher operating chip and Microsoft Corporation's Windows 3.1 or higher-numbered interface. The application developed as described in Example 10 is running on the desktop computer 130 and the warning signals will be displayed on the computer monitor 134 of the desktop computer 130 when they occur.

The present invention is not limited to any specific software by which computer implementation of the invention's method is achieved, nor is this invention limited to any specific method of developing suitable software. Another method for developing suitable software, called linking and embedding, involves the creation of an application in which the object is developed, the linking of that application with another application and embedding (sending) the developed object to the other application. This alternative linking and embedding method does not provide a real-time interface, and changes in the object do not affect the other application until an updating of the other application's object is requested. Such a method could be used for computer implementation of the method of the present invention, and there could in some instances be reason to prefer this method.

Another approach to computer implementation is to use developed code on embedded chips placed onto computer boards. The application developed must fit within the memory constraint of the chip used, which constraint is often 64 K. The use of assembler and C code is suitable, and at times preferable, when the memory constraint is 64 K. If the memory constraint is larger than 64 K, the application might be developed in C++ code. It is now believed that the C++ code for embedding into chips will not be used to provide a visual display such as that described above in Example 10.

A further approach to the computer implementation of the present method is to develop a stand-alone application or module that receives data via an A/D board.

There are a multitude of elections that might be selected when modeling the system and method of the present invention for a given physical system or for a given kind of physical system. Particularly when the present invention is computer implemented or assisted, modeling elections might comprise a complex array or battery of steps, measures and/or calculations. For instance, the method and system could include multiple layers of measurements, multiple parent and/or normalized mean selections, multiple layers of set and/or series definitions, and/or multiple layers of condition display elections, and of course various combinations of these elections. A sequence of measurements taken for instance each five seconds could be processed using sets of ten consecutive measurements and series of cumulative sets while simultaneously processing the same measurements using sets of thirty consecutive measurements and series limited to the last five sets. With the same stream of measurement data one could also simultaneously process only the measurements taken at longer time intervals, for instance the measurements taken each ten or each twenty seconds, grouping them into one or more differently defined sets, for instance sets of eight measurements, which in turn could be evaluated in more than type of series, for instance in a first series comprising the latest four sets and in a second series comprising the latest seven sets. A program could provide a single warning signal when an Nx or N1 condition is seen, or the Nx condition signal could differ from the N1 condition signal. The warning signals could stand alone or be augmented with one or more types of condition displays. One or more streams of measurement data could be separately processed using a plurality of parent mean values, or the separate processing of the measurement data can employ a parent mean value and a normalized mean being determined during the run. On the other hand, an efficient predictive evaluation might comprise an extremely simple method and system such as one of those exemplified herein.

A series must encompass a data stream of at least three values divided into at least three sets when the actual number of sets in a series is used when employing the w Table, and commonly, but not necessarily, there are a plurality of values in each set. Commonly but not necessarily each set will contain at least three values. Commonly but not necessarily each set will contain the same number of values. A series can contain only a single set, which circumstance would be seen in the first series of a cumulative-set group of series.

The present invention in broad embodiment is a method for the predictive identification of errant fluctuations in one or more operating parameters of a physical system, and/or for the predictive diagnosing of system reliability problems and/or system failure, comprising: determining the values of at least one kind of parameter at a plurality of time intervals; forming a data stream by arraying the parameter values in sequence; dividing the data stream into one or more sets; associating the sets into one or more series, processing at least one of the sets by determining the w value of the set by Formula 2.1 of $$w = (\text{square root of } n_g)(M - m_s)/(s_g \text{ or } s_p)$$

wherein $n_g$ is the number of the sets in the set's series, $m_s$ is the mean of the parameter values within the set, $s_g$ is an at-large-group standard deviation, $s_p$ is a parent-group standard deviation and M is a parent-group mean or a normalized mean, wherein the at-large-group standard deviation is determined by Formula 3 of $$s_g = \text{square root of } [(d_{gt}^2 - [d_{gc}]^2/n_g)/(n_g - 1)]$$

wherein $d_{gt}^2$ is the cumulative squares of the individual $d_g$ values of the sets in the set's series, wherein $d_{gc}$ is the cumulative totals of the individual $d_g$ values of the sets in the set's series, wherein $d_g$ is the difference between $m_s$ and the mean of the $m_s$ values of the sets in the set's series, and wherein $n_g$ is as defined above in Formula 2.1, and determining for the set whether an N0, Nx or N1 condition exists, wherein an N0 condition exists if w is less than "nx" wherein "nx is the w value consistent with x% probability of no significant difference between M and $m_s$ on the w Table or via a computational equivalent of the w Table for $n_Q$ number of parameter values, wherein an Nx condition exists if w is greater than nx but less than ny wherein ny is the w value consistent with y% probability of no significant difference between M and $m_s$ on the w Table or via a computational equivalent of the w Table for $n_Q$ number of parameter values, and wherein an N1 condition exists if w is greater than ny, wherein x and y are numbers and x is numerically greater than y and wherein $n_Q$ number of parameter values is $n_g$ number of parameter values when $s_g$ is used in Formula 2.1 and wherein $n_Q$ number of parameter values is greater than 120 parameter values when $s_p$ is used in Formula 2.1. The set's series encompasses a section of the data stream comprising at least three sets each including at least one of the parameter values when $s_g$ is used in Formula 2.1. The set's series encompasses a section of the data stream comprising at least one set including at least one of the parameter values when $s_p$ is used in Formula 2.1. The parameter values of the data stream are direct or indirect measurements of the values of an operating parameter of a physical system.

In a preferred embodiment, the present invention is a such method comprising processing at least one of the sets by determining the w value of the set by Formula 2 of $$w = (\text{square root of } n_g)(M - m_s)/s_g$$

and determining for the set whether an N0, Nx or N1 condition exists, wherein an N0 condition exists if w is less than "nx" wherein "nx is the w value consistent with x% probability of no significant difference between M and $m_s$ on the w Table or the computational equivalent of the w Table for $n_g$ number of parameter values, wherein an Nx condition exists if w is greater than nx but less than ny wherein ny is the w value consistent with y% probability of no significant difference between M and $m_s$ on the w Table for $n_g$ number of parameter values and wherein an N1 condition exists if w is greater than ny, wherein x and y are numbers and x is numerically greater than y. The set's series encompasses a data stream of at least three values.

The present invention is also a system for the predictive identification of errant fluctuations in one or more operating parameters of a physical system, and/or for the predictive diagnosing of system reliability problems and/or system failure, comprising: a means for determining the values of at least one kind of parameter at a plurality of time intervals; a means for forming a data stream by arraying the parameter values in sequence; a means for dividing the data stream into one or more sets each containing a plurality of the parameter values and an equal number of the parameter values; a means for associating the sets into one or more series, a means for processing a plurality of the sets separately by Formula 2.1 or Formula 2, and a means for determining for the set whether an N0, Nx or N1 condition exists, as discussed above. The means for determining the values of at least one kind of parameter at a plurality of time intervals; the means for forming a data stream, the means for dividing the data stream into one or more sets, the means for associating the sets into one or more series, the means for processing a plurality of the sets separately by Formula 2.1, and/or the means for determining for each of the sets processed whether an N0, Nx or N1 condition exists preferably are computer hardware equipped with sufficient software programs. The computer hardware preferably further includes a means for displaying at least one N0, Nx or N1 condition determined for at least one of the sets.

In the method and system of the present invention, in certain preferred embodiments x is 5 and y is 1. The operating parameter in certain preferred embodiments is an electrical performance or condition parameter. Each of the sets encompasses a plurality of the parameter values in certain preferred embodiments. A plurality of sets that are associated into a plurality of series are processed in certain preferred embodiments. A plurality of sets that are associated into a plurality of cumulative series are processed in certain preferred embodiments. A plurality of sets that are associated into a plurality of series are processed in certain preferred embodiments, and each of the series contains the same number of sequential sets. The sets contain at least three values in certain preferred embodiments. The series contains a plurality of sets, and each of the sets in the plurality of sets contains the same number of parameter values in certain preferred embodiments. M is a parent mean seen during normal operating conditions of the physical system in certain preferred embodiments.

The present invention in certain preferred embodiments includes signaling a warning and/or means for signaling a warning when an Nx or an N1 condition is seen. The present invention in certain preferred embodiments includes displaying the N0, Nx or N1 condition of at least one set and/or means for so displaying.

The present invention in certain preferred embodiments includes a plurality of layers of measurements, a plurality of parent and/or normalized mean selections, a plurality of layers of set and/or series definitions, and/or a plurality of layers of condition display elections, and/or combinations thereof.

As discussed above, the parameter values are a direct or an indirect measurement of the value of an operating parameter of a physical system. That operating parameter may be a performance parameter, a condition or state parameter or an environmental parameter. The physical system may be a substantially electrical system, a substantially electromechanical system, a substantially mechanical system, a substantially chemical system, or a substantially bio-mechanical system.

The present invention includes the method wherein either a single set or a plurality of sets that are associated into a plurality of series are processed. It also includes the method wherein the sets in a plurality of cumulative series are processed or wherein the series each contain a fixed number of sequential sets. Commonly but not necessarily M is a parent mean seen during normal operating conditions of a physical system. The method might further including a superimposed method for warning if one or more of a values exceeds a prescribed limit, such as a common warning device when a parameter value exceeds specifications The exemplification of the method and system of the present invention, both as to the various examples above and as to the narrative descriptions herein, are not limiting as to the elections and combinations within the scope of the present invention.

The following is the C++ code listing that is described in Example 10 above.

```
#include <owl\applicat.h>
#include <ocf\appdesc.h>
#include <ocf\automacr.h>
#include <ocf\ocreg.h>
#include <owl\framewin.h>
#include <math.h>
#include "stattest.h"
TPointer<TRegistrar>Registrar;
REGISTRATION_FORMAT_BUFFER(100);
BEGIN_REGISTRATION(AppReg)
        REGDATA(clsid, "{C1AA5580-D10F-101E-8273-040224007802}")
        REGDATA(progid, "Mean.Server")
        REGDAT(appname, "MeanValue")
        REGDATA(description, "Calculate Mean Value")
        REGDATA(cmdline, "-automation")
END_REGISTRATION
class OleServerApp;
class MeanValueServer : public TAutoBase {
        bool                            pmgiven;
```

```
                    bool                    stdgiven;
                    bool                    begin;
                    bool                    match;
                    double                  datapoint;
                    double                  accvalue;
                    double                  lastmeanvalue;
                    double                  meanofmeans;
                    double      *meanvalue;
                    int                         *occurrences;
                    int                         index;
                    double                  parentvalue;
                    double                  normal;
                    double                  std;
                    double                  sig;
                    char*                   prob;
public:
                    MeanValueServer();
                    ~MeanValueServer();
                    void                        UpdateData(double);
                    double                  GetData() { return datapoint; }
                    double                  GetMeanofMeans() {return
meanofmeans; }
                    void                        AccumulateValue();
                    void                        PutParentMean(double);
                    double                  CalculateMean(int m);
                    double                  NormalizeVariable();
                    double                  GetMeanValue(int i) { return
meanvalue[i]; }
                    void                        PutMeanValue(double);
                    int                         GetOccurrences(int i) { return
occurrences[i]; }
                    int                         GetIndex() { return index;}
                    double                  CalculateStandardDeviation();
                    void                        PutStd(double);
                    double                  CalculateSignificance();
                    char*                   FindProbability(int);
                    DECLARE_AUTOCLASS(MeanValueServer)
                        AUTOPROP(datapoint, GetData, UpdateData, double,)
                        AUTOPROPRO(index, GetIndex, int,)
                        AUTOPROPRO(meanofmeans, GetMeanofMeans, double,)
                        AUTOFUNC1V(PutStd, PutStd, double,)
                        AUTOFUNC1V(PutParentMean, PutParentMean, double,)
                        AUTOFUNC1V(PutMeanValue, PutMeanValue, double,)
                        AUTOFUNC1(FindProbability, FindProbability, TAutoString, int,)
                        AUTOFUNC1(CalculateMean, CalculateMean, double, int,)
                        AUTOFUNC1(GetOccurrences, GetOccurrences, int, int,)
                        AUTOFUNC1(GetMeanValue, GetMeanValue, double, int,)
                        AUTOFUNC0(NormalizeVariable, NormalizeVariable, double,)
                        AUTOFUNC0(CalculateStandardDeviation, CalculateStandardDeviation,
double,)
                        AUTOFUNC0(CalculateSignificance, CalculateSignificance, double,)
                        AUTOFUNC0V(AccumulateValue, AccumulateValue,)
};
DEFINE_AUTOCLASS(MeanValueServer)
        EXPOSE_METHOD(NormalizeVariable, TAutoDouble, "Normalize", "Function to Normalize
Mean Values",)
        EXPOSE_METHOD(CalculateMean, TAutoDouble, "!CalculateMean", "Function to Calculate
Mean Value",)
                REQUIRED_ARG(TAutoShort, "m")
        EXPOSE_METHOD(FindProbability, TAutoString, "Probability", "Determines failure of
device",)
                REQUIRED_ARG(TAutoShort, "i")
        EXPOSE_METHOD(GetMeanValue, TAutoDouble, "returnMean", "Returns all calculated mean
value",)
                REQUIRED_ARG(TAutoShort, "i")
        EXPOSE_METHOD(GetOccurrences, TAutoShort, "Occur", "occurrences of a particular mean
value",)
                REQUIRED_ARG(TAutoShort, "i")
        EXPOSE_METHOD(PutMeanValue, TAutoVoid, "ArMean", "Mean of the received values",)
                REQUIRED_ARG(TAutoDouble, "x")
        EXPOSE_METHOD(PutParentMean, TAutoVoid, "PutParentMean", "If parent mean exists, give
value!",)
                OPTIONAL_ARG(TAutoDouble, "x", "-9999.9")
        EXPOSE_METHOD(PutStd, TAutoVoid, "PutStd", "If parent standard deviation exists, give
value!",)
                OPTIONAL_ARG(TAutoDouble, "x", "-9999.9")
        EXPOSE_METHOD(CalculateStandardDeviation, TAutoDouble, "Standard", "Calculates
Standard Deviation",)
        EXPOSE_METHOD(CalculateSignificance, TAutoDouble, "Significance", "Calculates
Significance",)
```

-continued

```
             EXPOSE_METHOD(AccumulateValue, TAutoVoid, "Accumulate", "Function to accumulate all
data points",)
             EXPOSE_PROPRO(index, TAutoShort, "In", "Indentifies the number of mean values in the test",)
             EXPOSE_PROPRO(meanofmeans, TAutoDouble, "AverageMeans", "Gets the average of mean
values",)
             EXPOSE_PROPRW(datapoint, TAutoDouble, "Data", "Data points received from external
device",)
             EXPOSE_APPLICATION(MeanValueServer, "Mean", "Mean", "Statistics Class",)
END_AUTOCLASS(MeanValueServer, tfAppObject|tfCanCreate, "ArithmeticMean", "Calculates
Changes in mean values", 0)
MeanValueServer::MeanValueServer() : TAutoBase() {
         int i;
         meanvalue = new double[1500];
         occurrences = new int[1500];
         if(!meanvalue && !occurrences) return;
         index = 0;
         accvalue = 0.0;
         for(i=0;i<1500;i++) meanvalue[i] = -9999.9;
         for(i=0;i<1500;i++) occurrences[i] = 0;
         parentvalue = -9999.9;
         std = -9999.9;
         sig = 0.0;
         begin = true;
         match = false;
         pmgiven = true;
 stdgiven = true;
}
MeanValueServer::~MeanValueServer() {
         delete meanvalue;
         delete occurrences;
         ::GetAppDescriptor()->InvalidateObject(this);
}
void MeanValueServer::UpdateData(double x) {
         datapoint = x;
}
void MeanValueServer::AccumulateValue() {
         accvalue += datapoint;
}
void MeanValueServer::PutMeanValue(double x) {
         int i;
         int n = 0;
         double y = 0;
         for (i=0;i<(index+1);i++)
                  if(x == meanvalue[i]) {
                           occurrences[i] += 1;
                           match = true;
                  }
         if(!match) {
                  if(begin) {
                           meanvalue[0] = x;
                           occurrences[0] = 1;
                           begin = false;
                  }
                  else {
                          index++;
                          meanvalue[index] = x;
                          occurrences[index] = 1;
                  }
         }
         else match = false;
         for(i=0,i<(index+1);i++) {
                  n += occurrences[i];
                  y += meanvalue[i] * occurrences[i];
         }
         meanofmeans = y / (double)n;
}
void MeanValueServer::PutParentMean(double x = -9999.9) {
         if(x == -9999.9) pmgiven = false;
         else parentvalue = x;
}
void MeanValueServer::PutStd(double x = -9999.9) {
         if(x == -9999.9) stdgiven = false;
         else std = x;
}
         }
         return normal;
}
double MeanValueServer::CalculateStandardDeviation() {
         int i;
         int n = 0;
```

```
                double d, nom, A = 0.0, B = 0.0, C = 0.0, D = 0.0;
                if(stdgiven) return std;
                else {
                        for(i=0;i<(index+1);i++)n += occurrences[i];
                        if(n > 1) {
                                for(i=0;i<(index+1);i++) {
                                        d = meanvalue[i] - meanofmeans;
                                        C = (double)occurrences[i] * d;
                                        D = d * C;
                                        A += C;
                                        B += D;
                                }
                                nom = B - (pow(A, 2.0)/(double) n);
                                std = sqrt(nom/(n-1));
                                return std;
                        }
                        else return 0.0;
                }
        }
        double MeanValueServer::CalculateSignificance() {
        double MeanValueServer::CalculateMean(int m) {
                double armean = 0.0;
                armean = accvalue/(double)m;
                lastmeanvalue = armean;
         accvalue = 0.0;
         return armean;
        }
        double MeanValueServer::NormalizeVariable() {
                int i,j = 1;
                int max;
                if(pmgiven)
                        normal = parentvalue;
                else {
                        max = occurrences[0];
                        normal = meanvalue[0];
                        for(i = 1; i < (index + 1); i++) {
                                if(occurrences[i] > max) {
                                        normal = meanvalue[i];
                                        j = 1;
                                }
                                else if(occurrences[i] == max) {
                                        j++;
                                        normal += meanvalue[i];
                                }
                        }
                        normal /= (double) j;
                int i;
                int n = 0;
                for(i=0,i<(index+1);i++)n+=occurrences[i];
                if(std >= 1e-4) {
                        sig = (sqrt(n) * fabs(normal - lastmeanvalue))/std;
                        return sig;
                }
                else return 0.0;
        }
        char* MeanValueServer::FindProbability(int i) {
                static int n = 3;
                prob = new char[30];
                if(i >= n)prob = probabilityfinder(sig, i);
                return prob;
        }
        class OleServerApp : public TApplication {
                public:
                        void InitMainWindow() {
                                SetMainWindow(new TFrameWindow(0, "Mean Value Analysis"));
                                if(Registrar->IsOptionSet(amAutomation))
                                        nCmdShow = SW_HIDE;
                        }
        };
        IUnknown *ComponentFactory(IUnknown *outer, uint32 options, uint32/*id*/ = 0) {
                static MeanValueServer *meanServer = 0;
                IUnknown *ifc = 0;
                if(options & amShutdown)
                        return(options & amServedApp) ? 0 : outer;
                if(!meanServer)
                        meanServer = new MeanValueServer();
                ifc = *::Registrar->CreateAutoApp(TAutoObjectDelete<MeanValueServer>(meanServer), options,
        outer);
                if(options & amRun)
                        OleServerApp().Run();
```

-continued

```
        return ifc;
    }
}
int OwlMain(int, char*[]) {
    TOleAllocator oleAllocator(0);
    try {
            Registrar = new TRegistrar(AppReg, ComponentFactory, TApplication::GetCmdLine());
            if(!Registrar->IsOptionSet(amAnyRegOption))
                    Registrar->Run();
            Registrar = 0;
    }
    catch (TXBase& x) {
            ::MessageBox(0, x.why().c_str(), "OLE Exception", MB_OK);
    }
    return 0;
}
```

We claim:

1. A method for the predictive diagnosing of system reliability problems and/or system failure in a physical system through the predictive identification of errant fluctuations in one or more operating parameters of said physical system, comprising:

determining the values of at least one kind of operating parameter of said physical system by direct or indirect measurements of the values of said operating parameters at a plurality of time intervals;

forming a data stream by arraying said parameter values in sequence;

dividing said data stream into one or more sets;

associating said sets into one or more series, processing at least one of said sets by determining the w value of said set by Formula 2.1 of $$w = (\text{square root of } n_g)(M-m_s)/(s_g \text{ or } s_p)$$

wherein $n_g$ is the number of said sets in said set's series, $m_s$ is the mean of said parameter values within said set, $s_g$ is an at-large-group standard deviation, $s_p$ is a parent-group standard deviation and M is a parent-group mean or a normalized mean, wherein said at-large-group standard deviation is determined by Formula 3 of $$s_g = \text{square root of } [(d_{gt}^2 - [d_{gc}]^2/n_g)/(n_g-1)]$$

wherein $d_{gt}^2$ is the cumulative squares of the individual $d_g$ values of said sets in said set's series, wherein $d_{gc}$ is the cumulative totals of the individual $d_g$ values of said sets in said set's series, wherein $d_g$ is the difference between $m_s$ and the mean of the $m_s$ values of said sets in said set's series, and wherein $n_g$ is as defined above in Formula 2.1, and determining for said set whether an N0, Nx or N1 condition exists, wherein an N0 condition exists if w is less than nx wherein nx is the w value consistent with x% probability of no significant difference between M and $m_s$ on the w Table or via a computational equivalent of the w Table for $n_Q$ number of parameter values, wherein an Nx condition exists if w is greater than nx but less than ny wherein ny is the w value consistent with y% probability of no significant difference between M and $m_s$ on the w Table or via a computational equivalent of the w Table for $n_Q$ number of parameter values, and wherein an N1 condition exists if w is greater than ny, wherein x and y are numbers and x is numerically greater than y and wherein $n_Q$ number of parameter values is $n_g$ number of parameter values when $s_g$ is used in Formula 2.1 and wherein $n_Q$ number of parameter values is greater than 120 parameter values when $s_p$ is used in Formula 2.1, and wherein said set's series encompasses a section of said data stream comprising at least three sets each including at least one of said parameter values when $s_g$ is used in Formula 2.1 and wherein said set's series encompasses a section of said data stream comprising at least one set including at least one of said parameter values when $s_p$ is used in Formula 2.1.

2. The method of claim 1 wherein x is 5 and y is 1.

3. The method of claim 1 wherein said physical system is a substantially electrical system, a substantially electromechanical system, a substantially mechanical system, a substantially chemical system, or a substantially bio-mechanical system.

4. A method for the predictive diagnosing of system reliability problems and/or system failure in a physical system through the predictive identification of errant fluctuations in one or more operating parameters of said physical system, comprising:

determining the values of at least one kind of operating parameter of said physical system by direct or indirect measurements of the values of said operating parameters at a plurality of time intervals;

forming a data stream by arraying said parameter values in sequence;

dividing said data stream into one or more sets;

associating said sets into one or more series, processing at least one of said sets by determining the w value of said set by Formula 2 of $$w = (\text{square root of } n_g)(M-m_s)/s_g$$

wherein $n_g$ is the number of said sets in said set's series, $m_s$ is the mean of said parameter values within said set, $s_g$ is an at-large-group standard deviation, and M is a parent mean or a normalized mean, wherein said at-large-group standard deviation is determined by Formula 3 of $$s_g = \text{square root of } [(d_{gt}^2 - [d_{gc}]^2/n_g)/(n_g-1)]$$

wherein $d_{gt}^2$ is the cumulative squares of the individual $d_g$ values of said sets in said set's series, wherein $d_{gc}$ is the cumulative totals of the individual $d_g$ values of said sets in said set's series, wherein $d_g$ is the difference between $m_s$ and the mean of the $m_s$ values of said sets in said set's series, and wherein $n_g$ is as defined above in Formula 2, and determining for said set whether an N0, Nx or N1 condition exists, wherein an N0 condition exists if w is less than "nx" wherein "nx is the w value consistent with x% probability of no significant difference between M and $m_s$ on the w Table or the computational equivalent of the w Table for $n_g$ number of parameter values, wherein an Nx condition exists if w is greater than nx but less than ny wherein ny is the w value consistent with y% probability of no significant difference between M and $m_s$ on the w Table for $n_g$ number of parameter values and wherein an N1 condition exists if w is greater than ny, wherein x and y are numbers and x is numerically greater than y; and wherein said set's series encompasses a data stream of at least three values.

5. The method of claim 4 wherein x is 5 and y is 1.

6. The method of claim 4 wherein said physical system is a substantially electrical system, a substantially electromechanical system, a substantially mechanical system, a substantially chemical system, or a substantially bio-mechanical system.

7. The method of claim 4 wherein said operating parameter is an electrical performance or condition parameter.

8. The method of claim 4 wherein each of said sets encompasses a plurality of said parameter values.

9. The method of claim 4 wherein a plurality of sets that are associated into a plurality of series are processed.

10. The method of claim 4 wherein a plurality of sets that are associated into a plurality of cumulative series are processed.

11. The method of claim 4 wherein a plurality of sets that are associated into a plurality of series are processed, and wherein each of the series of said plurality of series contains the same number of sequential sets.

12. The method of claim 4 wherein said set contains at least three values.

13. The method of claim 4 wherein said set's series contains a plurality of sets, and wherein each of the sets in said plurality of sets contains the same number of parameter values.

14. The method of claim 4 wherein M is a parent mean seen during normal operating conditions of said physical system.

15. The method of claim 4 further including signaling a warning when an Nx or an N1 condition is seen.

16. The method of claim 4 further including displaying the N0, Nx or N1 condition of at least one set.

17. The method of claim 4 further including a plurality of layers of measurements, a plurality of parent and/or normalized mean selections, a plurality of layers of set and/or series definitions, and/or a plurality of layers of condition display elections, and/or combinations thereof.

18. The method of claim 4 further including a superimposed method for warning if one or more of said parameter values exceeds a prescribed limit.

19. A system for the predictive diagnosing of system reliability problems and/or system failure in a physical system through the predictive identification of errant fluctuations in one or more operating parameters of said physical system, comprising:

a means for determining the values of at least one kind of operating parameter of said physical system by direct or indirect measurements of the values of said operating parameters at a plurality of time intervals;

a means for forming a data stream by arraying said parameter values in sequence;

a means for dividing said data stream into one or more sets each containing a plurality of said parameter values and an equal number of said parameter values;

a means for associating said sets into one or more series, a means for processing a plurality of said sets separately by Formula 2.1 of $w$=(square root of $n_g$)$(M-m_s)/(s_g$ or $s_p)$ wherein $n_g$ is the number of said sets in said set's series, $m_s$ is the mean of said parameter values within said set, $s_g$ is an at-large-group standard deviation, $s_p$ is a parent-group standard deviation and M is a parent-group mean or a normalized mean, wherein said at-large-group standard deviation is determined by Formula 3 of $s_g$=square root of $[(d_{gt}^2-[d_{gc}]^2/n_g)/(n_g-1)]$ wherein $d_{gt}^2$ is the cumulative squares of the individual $d_g$ values of said sets in said set's series, wherein $d_{gc}$ is the cumulative totals of the individual $d_g$ values of said sets in said set's series, wherein $d_g$ is the difference between $m_s$ and the mean of the $m_s$ values of said sets in said set's series, and wherein $n_g$ is as defined above in Formula 2.1, and a means for determining for said set whether an N0, Nx or N1 condition exists, wherein an N0 condition exists if w is less than "nx" wherein "nx is the w value consistent with x% probability of no significant difference between M and $m_s$ on the w Table or via a computational equivalent of the w Table for $n_Q$ number of parameter values, wherein an Nx condition exists if w is greater than nx but less than ny wherein ny is the w value consistent with y% probability of no significant difference between M and $m_s$ on the w Table or via a computational equivalent of the w Table for $n_Q$ number of parameter values, and wherein an N1 condition exists if w is greater than ny, wherein x and y are numbers and x is numerically greater than y and wherein $n_Q$ number of parameter values is $n_g$ number of parameter values when $s_g$ is used in Formula 2.1 and wherein $n_Q$ number of parameter values is greater than 120 parameter values when $s_p$ is used in Formula 2.1, and wherein said set's series encompasses a section of said data stream comprising at least three sets each including at least one of said parameter values when $s_g$ is used in Formula 2.1 and wherein said set's series encompasses a section of said data stream comprising at least one set including at least one of said parameter values when $s_p$ is used in Formula 2.1.

20. The system of claim 19 wherein x is 5 and y is 1.

21. The system of claim 19 wherein said means for dividing said data stream into one or more sets, said means for associating said sets into one or more series, said means for processing a plurality of said sets separately by Formula 2.1, and/or said means for determining for each of said sets processed whether an N0, Nx or N1 condition exists comprise one or more computer software programs operating within sufficient computer hardware.

22. The system of claim 19 wherein said means for dividing said data stream into one or more sets, said means for associating said sets into one or more series, said means for processing a plurality of said sets separately by Formula 2.1, and/or said means for determining for each of said sets processed whether an N0, Nx or N1 condition exists comprise one or more computer software programs operating within sufficient computer hardware, and wherein said computer hardware further includes a means for displaying at least one N0, Nx or N1 condition determined for at least one of said sets.

* * * * *